(No Model.) 2 Sheets—Sheet 1.
G. F. STRAWSON.
AGRICULTURAL SPRINKLING MACHINE.
No. 415,587. Patented Nov. 19, 1889.
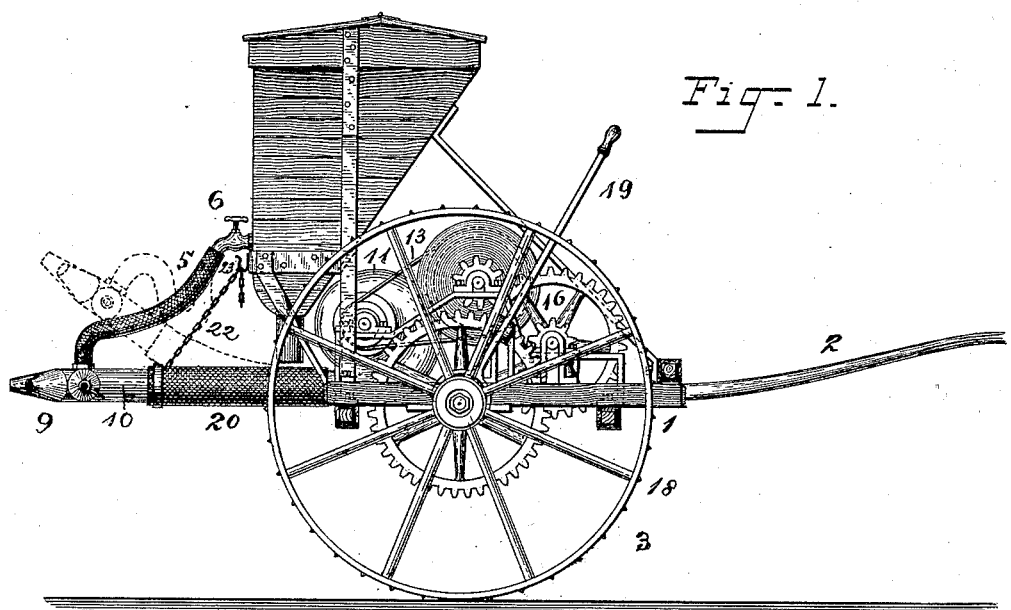
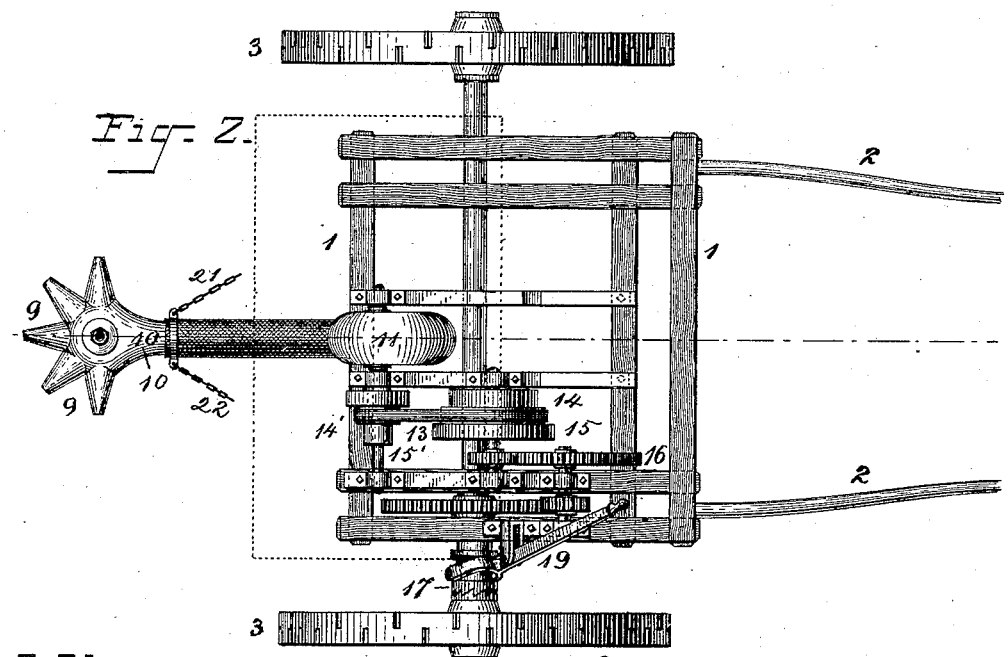
Witnesses.
John F. Nelson.
Geo. H. Knight, Jr.
Inventor.
George F. Strawson
By Knight Bros.
Attys.

(No Model.) 2 Sheets—Sheet 2.

G. F. STRAWSON.
AGRICULTURAL SPRINKLING MACHINE.

No. 415,587. Patented Nov. 19, 1889.

Witnesses.
John F. Nelson.
Geo. H. Knight. jr.

Inventor.
George F. Strawson
By Knight Bros
Attys

UNITED STATES PATENT OFFICE.

GEORGE FREDERICK STRAWSON, OF NEWBURY, COUNTY OF BERKS, ENGLAND.

AGRICULTURAL SPRINKLING-MACHINE.

SPECIFICATION forming part of Letters Patent No. 415,587, dated November 19, 1889.

Application filed June 24, 1889. Serial No. 315,338. (No model.) Patented in England February 3, 1888, No. 1,615; in France December 5, 1888, No. 193,745, and in Canada May 4, 1889, No. 31,259.

*To all whom it may concern:*

Be it known that I, GEORGE FREDERICK STRAWSON, of Newbury, in the county of Berks, England, have invented a new and useful Agricultural Sprinkling-Machine, (for which I have obtained Letters Patent in England February 3, 1888, No. 1,615; in France December 5, 1888, No. 193,745, and in Canada May 4, 1889, No. 31,259,) of which the following is a specification.

My invention relates to a device which is primarily for scattering or distributing liquid vermifuges, insecticides, fertilizers, &c., in the form of spray, over cultivated land and pastures. The implement is also applicable for use for simple watering or irrigating purposes.

For the sake of economy, my liquid holding and scattering devices are so constructed as to be readily placed in temporary substitution of mechanism employed for distributing dry granular matter—such as seeds, gypsum, and powdered or granulated composts and the like. The form which the implement takes when usable for distribution of dry matters is the subject of a separate application, filed 21st day of January, 1889, and whose serial number is 297,032.

My liquid-distributing devices comprise a wheeled implement to be drawn over the ground by animal or other power. Upon the frame of this implement is mounted an elevated tank or reservoir, from which, by means of a suitable valve-guarded duct, the liquid is led into a chamber that diverges in several nozzles, and called by me the "distributing-chamber." The distributing-chamber is inclosed in an air-chamber, which receives a blast of air from a fan or blower driven from one of the ground-wheels, and which operates to expel and scatter the liquid in the form of spray through the ventages of the said nozzles with any desired force.

Figure 3:
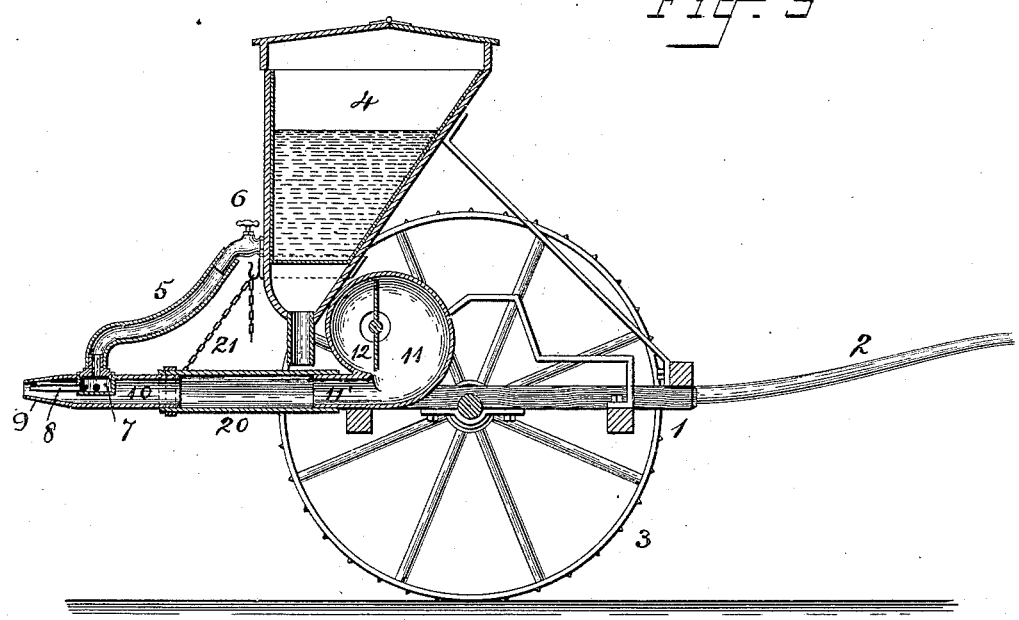
Figure 4:
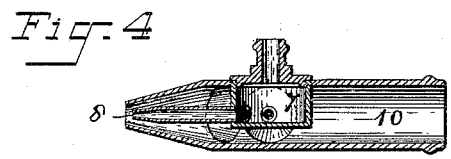
Figure 5:
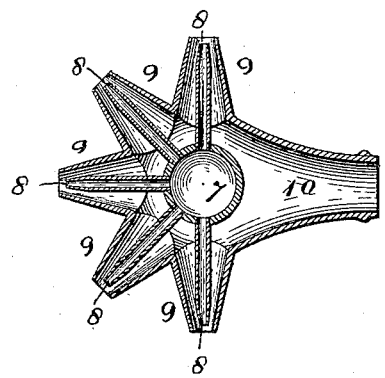

Referring to the accompanying drawings, which form a part of this specification, Figure 1 is a side elevation of a sprinkling implement embodying my invention. Fig. 2 is a plan of the same without the reservoir, the position of said reservoir being indicated by dotted lines. Fig. 3 is a section on the line 3 3. Fig. 4 is a vertical section through the distributing mechanism. Fig. 5 is a horizontal section through the distributing mechanism.

1 represents a frame provided with thills 2 and traveling on ground-wheels 3, to enable it to be hitched to and drawn over the ground by a horse or other draft-animal.

Suitably secured to the frame at any desired elevation is the tank or reservoir 4, from which a flexible pipe or duct 5, controlled by a valve or faucet 6, descends to a chamber 7, which I call the "receiving" or "distributing" chamber. From the rear side of the distributing-chamber diverge radially, as shown, a series of nozzles 8, which are surrounded by tuyeres 9, that diverge radially from an air-chamber 10, which receives air from a fan or blower 11, whose beater 12 is rotated at a high speed by any suitable connection—such as by band 13, pulleys 14 14' or 15 15', and a train of cog-wheels 16—with a clutch 17, capable of being at any moment locked to or released from one of the ground-wheels 18. The clutch is operated by a lever 19.

To enable adjustment of the blast force to suit the requirements of any particular case, depending on the kind of crop, or of insect-pest, the nature of the ground, the fluidity or viscosity of the liquid, I preferably provide two or more gradations of pulleys. Thus for a moderate blast the pulleys 14 14' are employed; for a higher beater velocity, and consequently more vigorous blast, the belt is shifted to the pulleys 15 15'. By a greater or less opening of the cock 6 and a greater or less speeding up of the blast, the operator secures any desired force and volume of delivery.

The attachment of the distributing-chamber 7 to the ventage 11' of the fan-case is preferably by a flexible hose 20, and the distributing-chamber, being suspended by chains 21 22 to hook 23, can be set at any desired upward pitch or inclination for a more or less broad and scattered delivery.

Two or more distributers may be arranged on one machine.

Having thus described my invention, the following is what I claim as new therein and desire to secure by Letters Patent:

In an agricultural sprinkling-machine, the combination, with the wheeled vehicle and the tank and rotary fan mounted thereon, of gear-wheels for driving said fan, a clutch for driving said gear-wheels adapted to engage the hub of one of the ground-wheels of the vehicle, the air-chamber 10, having horizontal radially-arranged nozzles 9, a flexible pipe 20, connecting said chamber with said fan, the chamber 7, secured in chamber 10 and having the tuyeres 8 projecting into said nozzles, a flexible pipe connecting chamber 7 with the tank, and a chain or support secured to said pipe 20 for supporting chamber 10 and adjusting the inclination of said nozzles, substantially as set forth.

GEORGE FREDERICK STRAWSON.

Witnesses:
EMEN SEYMOUR SALAMAN,
65 *and* 66 *Chancery Lane, London, Solicitor.*
FRANK DEVER SUMMERS,
65 *and* 66 *Chancery Lane, London, Clerk.*